Figure 1:
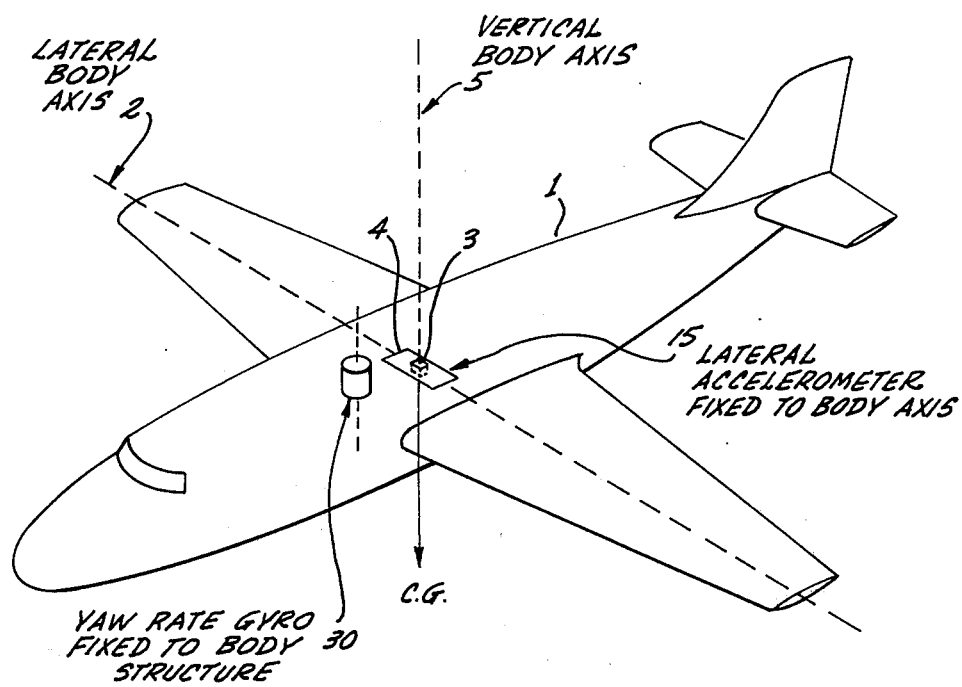

United States Patent [19]

Boone et al.

[11] 4,006,870
[45] Feb. 8, 1977

[54] SELF-ALIGNING ROLL OUT GUIDANCE SYSTEM

[75] Inventors: Jimmie H. Boone; Robert D. Simpson, both of Bellevue, Wash.

[73] Assignee: The Boeing Company, Seattle, Wash.

[22] Filed: July 10, 1975

[21] Appl. No.: 594,833

Related U.S. Application Data

[63] Continuation of Ser. No. 428,515, Dec. 26, 1973, abandoned.

[52] U.S. Cl. .......................... 244/184; 235/150.22
[51] Int. Cl.² ........................................... G05D 1/12
[58] Field of Search .................. 73/178 R, 178 T; 235/150.22, 150.26, 150.27; 244/77 A, 77 B, 77 E, 77 G, 184, 179, 189, 191; 318/583–585; 340/27 R, 27 NA; 343/5 LS, 6 C, 107, 108 R

[56] References Cited

UNITED STATES PATENTS

| | | | |
|---|---|---|---|
| 2,827,250 | 3/1958 | Rusler, Jr. | 244/77 E |
| 2,948,495 | 8/1960 | Maregraf | 244/77 E |
| 3,110,458 | 11/1963 | Bishop | 244/77 A |
| 3,136,502 | 6/1964 | Auld, Jr. et al. | 244/77 A |
| 3,223,363 | 12/1965 | Boothby et al. | 244/77 A |
| 3,843,077 | 10/1974 | Boone et al. | 244/77 B X |

Primary Examiner—Stephen G. Kunin
Attorney, Agent, or Firm—Conrad O. Gardner

[57] ABSTRACT

Guidance along the runway centerline when visibility conditions do not permit adequate visual cues for manual control are provided utilizing lateral acceleration and bank angle information. An aircraft type airborne vehicle can touchdown with a crab angle in the presence of a crosswind and the present system provides the proper command to decrab the aircraft and return the aircraft to the centerline.

7 Claims, 2 Drawing Figures

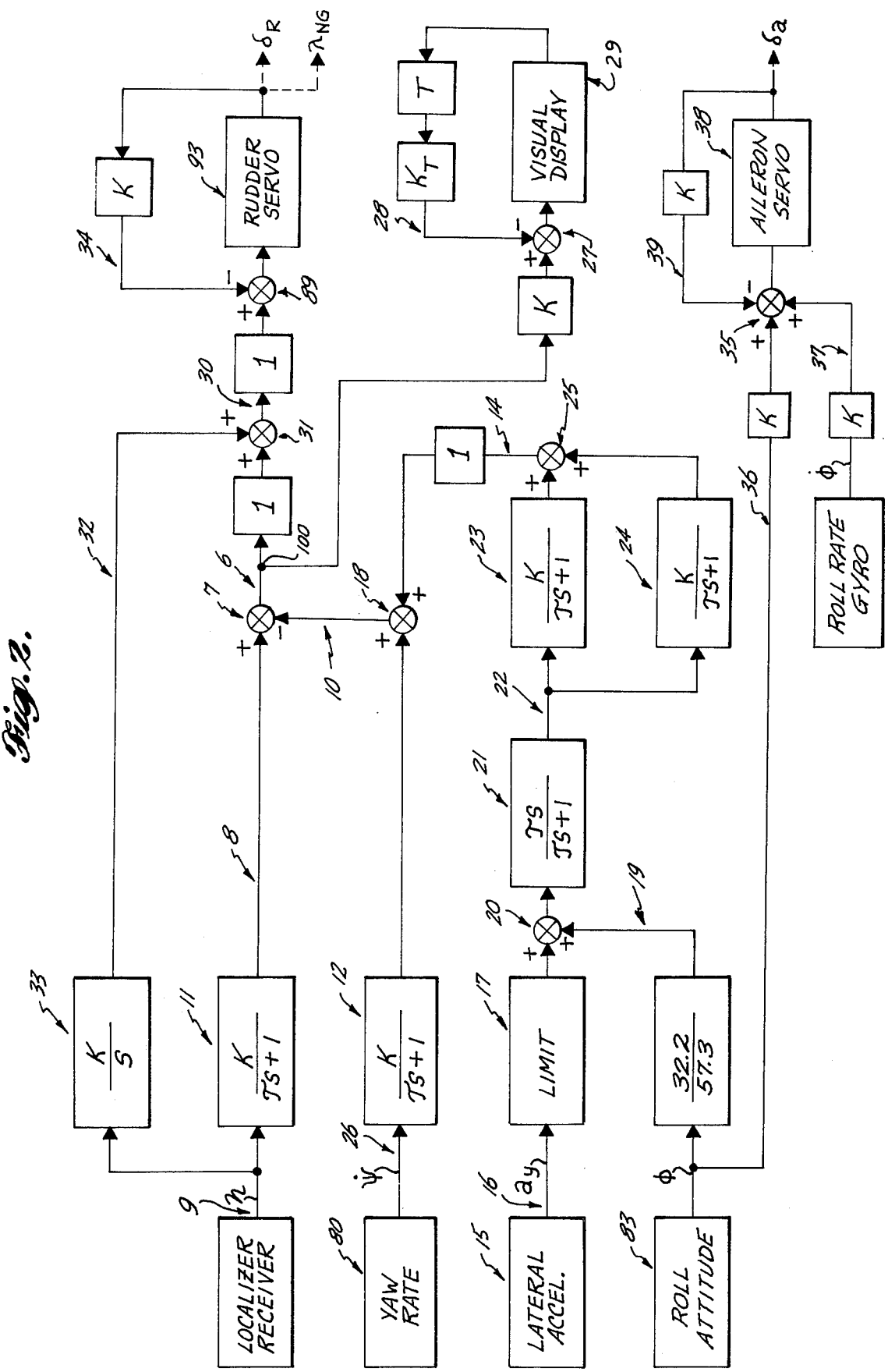

SELF-ALIGNING ROLL OUT GUIDANCE SYSTEM

This is a continuation of our application, U.S. Ser. No. 428,515 which was filed Dec. 26, 1973, now abandoned.

This invention relates to control systems for use in airborne vehicles and more particularly to an aircraft roll-out guidance command signal processing method and system whereby landing performance and subsequent roll along the runway are improved.

Known control systems operate in the terminal phase of an aircraft landing to align the flight path of the aircraft with the runway centerline by means combining localizer deviation signals and bank attitude signals to provide a roll steering command. In these systems, should a crosswind be present, the roll signal processing means included means to eliminate the steady state component of the aircraft heading so that the aircraft automatically crabs into the wind in the amount necessary to maintain a predetermined flight path. In an aircraft landing procedure, the aircraft is maintained on a flight path coincident with the runway centerline but may be crabbed into the prevailing wind.

Landing techniques based on the above known systems have generally required an additional means for aligning the aircraft longitudinal axis with the runway centerline just prior to touchdown preparatory to a smooth transition between controlled flight and the landing rollout without inducing unacceptable lateral deviations from the intended path once the aircraft is on the ground. Means have been provided to initiate a decrab maneuver or a forward slip maneuver during the last seconds of flight. The former maneuver accomplished by rudder control is susceptible to unpredictable lateral error as the aircraft is swept from the flight path by the prevailing crosswinds. The latter maneuver requires means to cross control between rudder and aileron control surfaces and results in the aircraft landing with the upwind wing lowered. In such an attitude, shock forces are not evenly distributed among the main landing gear and wing, and engine pod probability of impingement is statistically increased.

The present invention relates to an improvement in landing and rollout methods by providing a system for decrabbing the aircraft in a smooth timely manner immediately subsequent first touchdown and generating steering control signals to continuously control subsequent lateral errors from the intended flight path.

The advantages of the present method and apparatus are now immediately evident, and particularly so in regard to automatic landing prodedures during conditions of poor visibility. That is, the decrab maneuver is delayed until after touchdown so that the equilibrium of the aircraft during crosswind conditions is left undisturbed, angles of wing or engine pod impingement are statistically maximized, and the steering command comprises only rudder commands rather than a proportional combination of rudder and aileron control surface cross-control commands.

Accordingly an object of the present invention is to provide aircraft decrab and rollout guidance command signal processing whereby transition from a heading crab to alignment of the aircraft longitudinal axis with the runway centerline is initiated subsequent to first touchdown, and steering command signals are provided either for display to pilot or utilized as servo control commands for automatic control of the aircraft during decrab and rollout procedures.

A feature of the present invention includes the summing of a signal representative of derived inertial ground track rate with a signal representative of aircraft rate of yaw to provide a first signal utilized in heading steering signal processing to command the rudder to align the longitudinal axis of the aircraft with the runway centerline and the further inclusion of means for providing a second signal for utilization in roll axis control signal processing for commanding the aileron control surfaces to therby maintain the aircraft in a wings level attitude.

The above and other features and objects of the present invention will become apparent upon a reading of the following description in conjunction with the accompanying drawings in which:

FIG. 1 is a diagrammatic representation of an aircraft together with lateral accelerometer positioning and yaw rate gyro positioning as utilized in the present system; and, FIG. 2 is a block diagram of a roll and yaw axis control system utilizing automatic control apparatus including decrab, roll out guidance, and wings levelling signal processing means in accordance with a preferred embodiment of the present invention.

Turning now to FIG. 1, there is shown an aircraft 1 having a lateral body axis 2 passing through the center of gravity 3 of the aircraft. A lateral accelerometer 15 is fixed to the body of the craft and disposed so that the sensitive axis of the accelerometer 15 is parallel to the lateral body axis 2. A vertical body axis 5 is shown also passing through the center of gravity 3. A rate sensitive gyro 80 is fixed to the body and disposed so that the sensitive axis is parallel to the vertical body axis 5.

The present invention may be more easily understood as stemming from a consideration of the lateral motion of the aircraft which can be described as follows:

$$\dot{\gamma} = \int_0^t [V \sin(\dot{\psi} + \overset{\circ}{\beta}) + g\phi] dt = V \sin \psi_{GT} \quad (1)$$

where $\dot{\gamma}$ = lateral translation rate
$\nu$ = aircraft velocity
$\dot{\psi}$ = rate of yaw about the vertical axis
$\overset{\circ}{\beta}$ = aerodynamic side force rate
$g$ = gravitational constant
$\phi$ = roll attitude of the aircraft
$\Psi_{GT}$ = inertial ground track heading With reference to equation (1) it may be seen that the parenthetical quantity is the craft's lateral acceleration, $$\alpha_y = (\ddot{\psi} + \overset{\circ}{\beta})\nu$$

$\alpha_y$ = lateral acceleration

Therefore, by appropriately scaling and subtracting the quantity representing roll attitude, the lateral displacement can be described in terms of sensed parameters;

$$\overset{\circ}{\gamma} = \int_0^t [V \sin \delta_y - g\phi] dt \quad (2)$$

As the aircraft decelerates after touchdown, the term $\overset{\circ}{\beta}$ approaches zero. Thus a suitable control equation can be formulated by setting $$\gamma = -V \sin [\hat{\gamma} + \overset{\infty}{\gamma}]_{\overset{\rightarrow}{\beta} \rightarrow o} \quad (3)$$

where $\dot{\gamma}$ is formed by the yaw rate gyro.

$$\frac{d}{dt}(\overset{\infty}{\gamma}) = \frac{d}{dt}\left[\int_o^t [V \sin \alpha_\gamma - g \phi] dt\right] = V \sin \dot{\psi} \quad (4)$$

It may be seen by inspection of equation (1) that there is a decided advantage in utilizing the lateral accelerometer. That is, upon touching down of the aircraft with the landing gear disposed in a crabbed position resulting from local crosswinds, a side force proportional to the crab angle is transmitted through the gear to the body of the aircraft, thence to lateral accelerometer sensing element 15. Thus decrab maneuvers can be initiated without reference to a magnetic heading sensor, or to data stored from such sensors, thereby materially decreasing the complexity of the present decrab and rollout guidance system.

Turning now to FIG. 2, there is shown a block diagram of the present roll and yaw axis control system which includes input information developed from a lateral accelerometer 15 and a yaw rate gyro 80. In the control system of FIG. 2 a yaw axis steering command signal 6 is provided by combining in mixing device 7, a signal 8 representative of aircraft displacement which may be derived from a localizer receiver 9 together with a signal 10 representative of rate of change of displacement of the aircraft. Thus in the present system embodiment, a localizer receiver 9 provides a signal which is filtered to eliminate unwanted high frequency noise and limited to a predetermined maximum allowable error by a combined lag filter-limited circuit means 11 and coupled to mixing device 7.

In accordance with the present invention, a signal 26 representative of yaw rate is coupled through low pass and lag filter circuit means 12 to mixing device 13 and combined with a shaped signal 14 derived from lateral accelerometer 15. Signal 16 representative of lateral acceleration is coupled through limiting circuit means 17 and combined in mixing device 20 with an appropriately scaled signal 19 representative of roll attitude, the output of mixing device 20 being coupled through high pass filter circuit means 21 to provide a signal 22 representative of roll compensated lateral acceleration with minor null voltage and installation errors washed out. Thus a roll attitude sensor 83 provides a signal which, properly scaled and mixed in mixing device 20, eliminates the gravity induced component of the lateral accelerometer signal 16. The signal 22 representative of lateral acceleration is coupled through pseudo integrator circuit means 23 comprising a low pass lag filter circuit having a long time constant and through a second low pass lag filter circuit 24 coupled in parallel with pseudo integrator circuit means 23. The second low pass filter circuit 24 time constant is substantially shorter than that of pseudo integrator circuit means 23 to thereby provide a quickening signal which when combined in mixing device 25 with the output signal from pseudo integrator circuit means 23 provides the aforementioned shaped signal 14.

Upon touchdown of the aircraft landing gear on the runway surface, an accelerometer shock output signal representative of the crab angle of the aircraft is transmitted through quickening filter 24 and through mixing devices 25 and 13 respectively to form the initial decrab steering command signal 6. If a localizer error develops as the craft decrabs, indicating lateral displacement from the intended path, a signal 8 proportional to this displacement is generated which signal is combined with the decrab command signal in mixing device 7. A signal representative of the rate of displacement of the aircraft center of gravity is provided by coupling the signal 22 representative of compensated lateral acceleration through pseudo integrator circuit means 23. The rate signal is accordingly combined with the signal 8 representative of aircraft displacement to modify the restoring command of steering command signal 6 according to the rate of deviation or closure with the intended path.

In instances where the runway is covered with water or ice, a disproportionate error will develop between the yaw rate representative signal 26 and the shaped accelerometer signal 14 representing a tendency of the aircraft to skid inasmuch as, at low contact frictions on the runway, the aircraft center of gravity will continue down a straight line even though the aircraft is rotating about its vertical axis. Thus the error between the yaw rate representative signal 26 and the shaped accelerometer signal 14 when combined together to form a composite signal 10, will further cause modulation of the displacement signal 8 to decrease the magnitude of the steering command thereby suppressing skidding.

In accordance with a further feature of the present invention, steering command signal 6 available at system output terminal 100 may be utilized to drive a visual display as hereinafter described. Steering command signal 6 appropriately scaled by a scaling circuit K is thereafter combined in mixing device 27 with a feedback signal 28 proportional to the rate of movement of display device 29. Thus a rate sensing device represented by the block symbol T might be a tachometer and gain scaling circuit means $K_T$ provides a rate feedback signal 28 to be mixed or combined with the scaled steering command signal 6 thereby closing the loop around visual display device 29 and its driving servo mechanism T.

In accordance with another feature of the present control system, steering command signal 6 may be utilized for providing automatic control of the aircraft as described in the following.

A rudder servo command signal 30 is provided by combining in mixing device 31, the steering command signal 6 with the timeintegrated displacement signal 32. Thus the localizer error signal 9 is coupled through integrator circuit means 33, and the output signal 32 is combined with the steering command signal 6 thereby providing a means for compensating for internal system null errors and centering the aircraft on the intended path. Rudder servo command signal 30 is combined by mixing circuit means 89 with a feedback signal 34 proportional to the displacement of the rudder from the trim position thereby closing the loop incuding scaling circuit K around servo mechanism 93. The rudder servo command signal 30 is limited in magnitude by lag filter limiter circuit means 11 to insure against objectionably large rudder displacement commands and to smooth the aircraft controlled response in the presence of large initial displacements from the intended path.

To maintain a wings-level attitude during the decrab and roll out guidance maneuvers, an aileron servo command signal is provided by combining in mixing device 35, signal 36 representative of roll attitude, and signal 37 representative of roll rate. Mixing device is shown with symbology indicating an adder circuit as are the other mixing devices 7, 31, 89, 13, 20, 25, and 27. To close the loop around aileron servomechanism 38, a feedback signal 39 proportional to displacement of the ailerons from trim position is provided by the loop incuding a gain scaling circuit means K, feedback signal 39 being combined as shown in mixing device 35 with the combined signals 36 and 37 representative respectively of roll attitude and roll rate.

What is claimed is:

1. In combination in an aircraft control system for controlling the path of the aircraft along the surface of a runway;
   first means comprising lateral velocity signal generating means;
   second means comprising yaw rate signal generating means;
   third means comprising adder circuit means for combining said signal representative of lateral velocity and said signal representative of yaw rate thereby providing a further signal representative of combined skid and lateral movement of the aircraft.

2. In combination in an aircraft control system:
   first means comprising lateral velocity signal generating means;
   second means comprising yaw rate signal generating means;
   third means comprising adder circuit means for combining said signal representative of lateral velocity and said signal representative of yaw rate thereby providing a further signal representative of combined skid and lateral movement of the aircraft; and, wherein said first means further comprises:
   lateral acceleration signal generating means,
   roll attitude signal generating means,
   adder circuit means for combining said signal representative of lateral acceleration and said signal representative of roll attitude for providing a third signal representative of ground track rate,
   high pass filter circuit means,
   first low pass filter circuit means,
   second low pass filter circuit means, and
   further adder circuit means for combining the outputs of said first low pass filter circuit means and said second low pass filter circuit means, said high pass filter circuit means connected in series circuit between said adder circuit means thereby providing said third signal, and the combined inputs of said first low pass filter circuit means and said second low pass filter circuit means further providing a signal representative of lateral velocity at the output of said further adder circuit means.

3. In combination in an aircraft flight control system for controlling the path of the aircraft along the surface of a runway:
   first means for providing a first signal representative of yaw rate of the aircraft;
   second means for providing a second signal representative of inertial ground track, and
   third means for combining said first and second signals to provide a third signal representative of rate of lateral displacement of said aircraft, and
   fourth means for providing a fourth signal representative of lateral displacement of said aircraft from intended path; and
   fifth means for combining said signal representative of rate of lateral displacement of said aircraft and said signal representative of lateral displacement of said aircraft from intended path to provide a yaw axis steering command signal for the aircraft, further including rudder control means responsive to said yaw axis steering command signal;
   sixth means for providing an attitude hold command signal, and aileron control means responsive to said attitude hold command signal.

4. In an airborne vehicle control system having an output terminal for coupling to utilization means:
   first means for providing a first signal representative of the lateral error between actual position and intended path of said vehicle;
   second means for providing a second signal representative of lateral velocity of the center of gravity of said vehicle;
   third means for providing a third signal representative of the angular rate of rotation of said vehicle about its vertical axis; and
   adder circuit means coupled to said output terminal for summing said second signal and said third signal and cancelling said first signal, wherein said first means for providing said first signal comprises means for generating a signal representative of lateral position error, first lag filter circuit means having an output signal voltage limited to a predetermined value, the output terminal of said means for generating a signal representative of lateral position error coupled to the input of said first lag filter circuit means, the output of said first lag filter circuit means providing said first signal; and, wherein
   said second means for providing said second signal comprises means for generating a signal representative of lateral acceleration, second lag filter circuit means, third lag filter circuit means having an input terminal coupled to the input terminal of said second lag filter circuit, said second lag filter circuit input terminal also coupled to the output of said means for generating a signal representative of lateral acceleration;
   first adder circuit means coupled to the output terminals of said second lag filter circuit means and said third lag filter circuit means for summing the respective output voltages of said second and third lag filter circuit means thereby providing said second signal.

5. In an airborne vehicle control system having an output terminal for coupling to utilization means:
   first means for providing a first signal representative of the lateral error between actual position and intended path of said vehicle;
   second means for providing a second signal representative of lateral velocity of the center of gravity of said vehicle;
   third means for providing a third signal representative of the angular rate of rotation of said vehicle about its vertical axis; and
   adder circuit means coupled to said output terminal for summing said second signal and said third signal and cancelling said first signal, wherein said first means for providing said first signal comprises means for generating a signal representative of lateral position error, first lag filter circuit means having an output signal voltage limited to a predetermined value, the output terminal of said means for generating a signal representative of lateral position error coupled to the input of said first lag filter circuit means, the output of said first lag filter circuit means providing said first signal; and, wherein said second means for providing said second signal comprises means for generating a signal representative of lateral acceleration, second lag filter circuit means, third lag filter circuit means having an input terminal coupled to the input terminal of said second lag filter circuit, said second lag filter circuit input terminal also coupled to the output of said means for generating a signal representative of lateral acceleration;

first adder circuit means coupled to the output terminals of said second lag filter circuit means and said third lag filter circuit means for summing the respective output voltages of said second and third lag filter circuit means thereby providing said second signal, and wherein said means for generating a signal representative of lateral acceleration further comprises:

vehicle body referenced lateral accelerometer means, limiter circuit means, and second adder circuit means, said limiter circuit means coupled between said vehicle body referenced lateral accelerometer means and said second adder circuit means;

roll attitude sensor means having an output terminal coupled to the input of said second adder circuit means for summing said limited signal from said vehicle body referenced lateral accelerometer means with the roll attitude sensor signal; and high pass filter circuit means having an input coupled to the output of said second adder circuit means, the output of said high pass filter circuit means providing said signal representative of lateral acceleration.

6. In an airborne vehicle control system for controlling the path of the airborne vehicle along the surface of a runway, said system having an output terminal for coupling to utilization means:

first means for providing a first signal representative of the lateral error between actual position and intended path of said vehicle;

second means for providing a second signal representative of lateral velocity of the center of gravity of said vehicle;

third means for providing a third signal representative of the angular rate of rotation of said vehicle about its vertical axis;

adder circuit means coupled to said output terminal for summing said second signal and said third signal and cancelling said first signal;

aileron position sensor means;

roll rate sensor means;

roll attitude sensor means;

aileron control servomechanism neans; and wherein the output of said roll rate sensor means and the output of said roll attitude sensor means are summed at the input terminal of said aileron control servomechanism means; and, wherein said aileron position sensor means is connected in feedback circuit with said airleron control servomechanism means input terminal.

7. In combination in an aircraft control system for steering an aircraft to and along the centerline of a runway subsequent to landing:

first means for providing a first signal representative of deviation from said centerline;

second means for generating a second signal representative of lateral velocity of said aircraft;

third means for providing a third signal representative of lateral acceleration of said aircraft;

fourth means for generating a fourth signal representative of yaw rate of said aircraft;

fifth means including adder circuit means for combining said first signal, said second signal, said third signal, and said fourth signal to provide a fifth signal representative of aircraft steering actuator position command;

sixth means including aircraft steering actuator means coupled to said fifth means for steering said aircraft to and along the centerline of said runway.

* * * * *